United States Patent [19]
van der Toorn et al.

[11] 3,880,598
[45] Apr. 29, 1975

[54] RESIDUAL OIL HYDRODESULFURIZATION APPARATUS

[75] Inventors: Lambertus J. van der Toorn; Heinz Voetter, both of Amsterdam, Netherlands

[73] Assignee: Shell Oil Company, New York, N.Y.

[22] Filed: Dec. 22, 1972

[21] Appl. No.: 317,574

Related U.S. Application Data

[62] Division of Ser. No. 96,920, Dec. 10, 1970, Pat. No. 3,730,880.

[52] U.S. Cl.............. 23/289; 23/288 R; 214/17 B; 23/288 G
[51] Int. Cl............................................... B01j 9/04
[58] Field of Search............. 23/288 G, 288 R, 289; 208/213, 216, 217, 150, 171, 173, 176; 214/17 B, 17 A, 17 C; 137/237, 238, 241, 246.12; 222/148; 34/85

[56] References Cited
UNITED STATES PATENTS

| | | | |
|---|---|---|---|
| 2,826,320 | 3/1958 | Payne et al.................. | 214/17 B X |
| 2,854,400 | 9/1958 | Weisz.......................... | 23/288 G X |
| 2,926,802 | 3/1960 | Stuewer....................... | 214/17 B X |
| 3,347,741 | 10/1967 | Hutchinson................... | 214/17 B X |
| 3,547,809 | 12/1970 | Ehrlich et al................. | 208/176 X |

*Primary Examiner*—Joseph Scovronek
*Assistant Examiner*—Timothy W. Hagan
*Attorney, Agent, or Firm*—John M. Duncan

[57] ABSTRACT

An apparatus for hydrodesulfurizing residual hydrocarbon oils in a substantially liquid phase continuous process wherein catalyst is periodically introduced at the top of the reactor and spent catalyst is periodically withdrawn from the bottom thereof, said apparatus comprising at least one high-pressure reaction vessel containing a catalyst bed and having an inlet for introducing residual oil and hydrogen, an outlet for withdrawing reaction products and being connected by conduits and valves to a high-pressure vessel from which fresh catalyst can be introduced to the top of said catalyst bed and to a high-pressure vessel into which spent catalyst can be discharged from the bottom of said catalyst bed.

4 Claims, 2 Drawing Figures

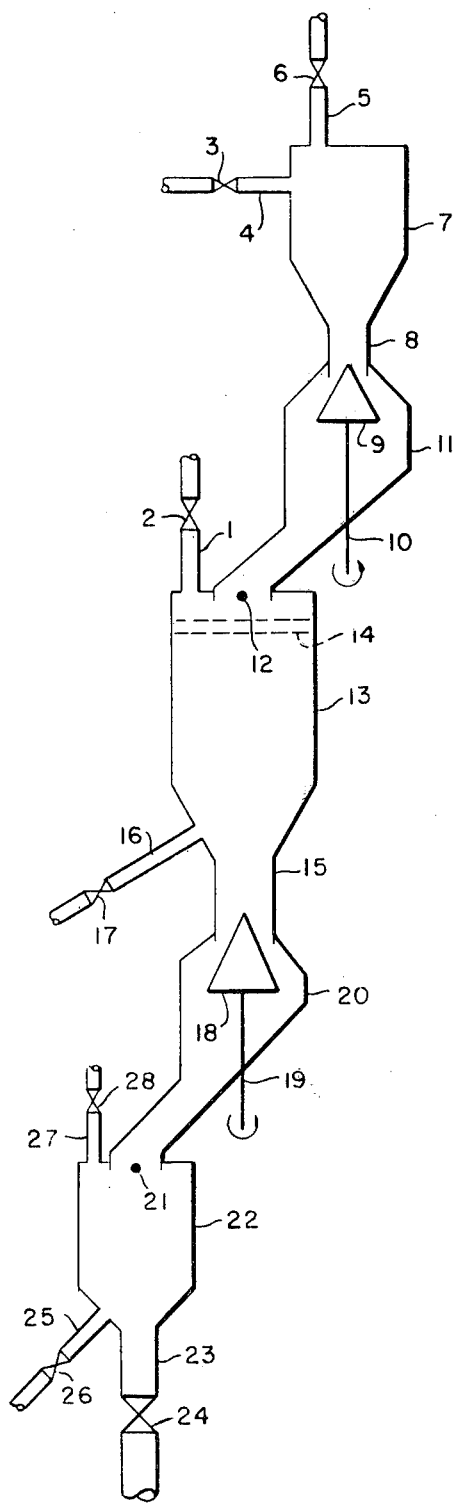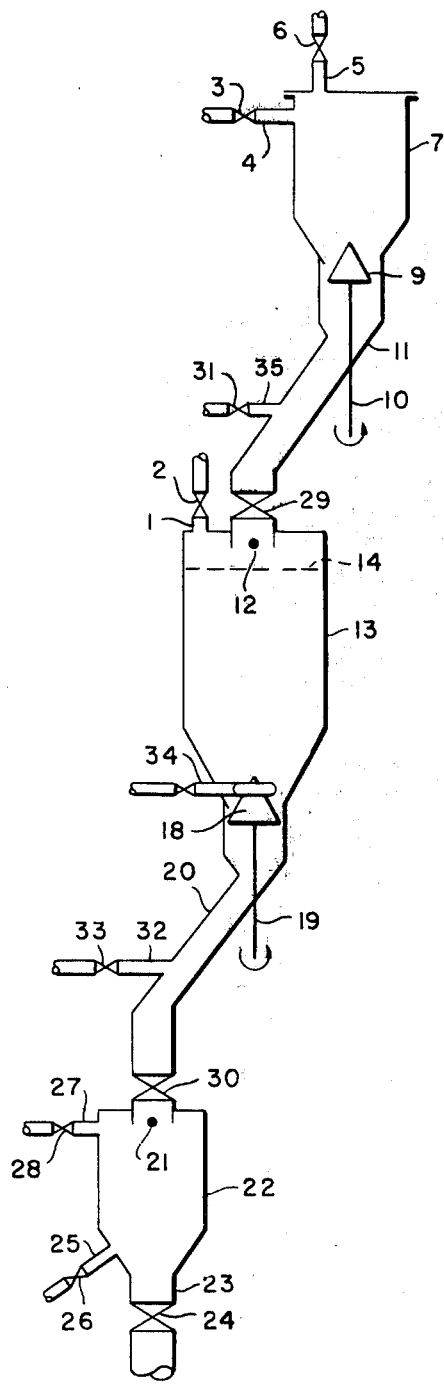
FIG. 1
FIG. 2

RESIDUAL OIL HYDRODESULFURIZATION APPARATUS

This is a division of application Ser. No. 96,920, filed Dec. 10, 1970, now U.S. Pat. No. 3,730,880.

BACKGROUND OF THE INVENTION

The present invention relates to a continuous process for the catalytic hydroconversion of a residual hydrocarbon oil, in particular the hyrdodesulphurization thereof, which process is carried out substantially in the liquid phase over a substantially fixed catalyst bed. The invention further relates to apparatus in which such a process may be carried out.

In view of the growing concern about air pollution by sulphur dioxide resulting from the combustion of fuels containing relatively large amounts of sulphur, an increasing number of regulations with respect to the sulphur content of fuels are laid down by governments and municipal authorities. As a consequence, crude oils, residual petroleum oils or oil fractions containing relatively high proportions of sulphur compounds are becoming more difficult to sell than corresponding oils of low sulphur content and thus have to be desulphurized first before they can be put on the market. However, the catalytic hydrodesulphurization of the said heavy oils and crudes, via the direct route still constitutes a problem both catalytically and technologically.

Light petroleum oil fractions and other hydrocarbon distillates containing sulphur compounds can easily be desulphurized in a fixed-bed process in which the said oil fractions and distillates are passed over suitable hydrodesulphurization catalysts in the presence of hydrogen. The technology for this type of process is well-established and amply described in the literature. Fixed-bed hydrodesulphurization of residual oils and crude oils, however, is deemed to be impossible or at least economically unattractive since the hydrodesulphurization reactor has to be shut down very frequently in order to replace the spent catalyst by fresh. The causes for this are mainly two-fold. As is known, crude oils including topped or vaccum-reduced crude oils as well as other heavy hydrocarbon oil fractions, such as black oils, visbreaker effluent, tar-sand oils and the like, contain various metal-containing and metal-free components of high molecular weight. The said components detrimentally affect the catalytic hydrodesulphurization process to which such crude oils or heavy hydrocarbon oil fractions are subjected, as well as the particular catalyst employed in the said process, as will be explained hereinafter.

Included in the metal-free components are large quantities of resins, polyaromatics and asphaltenes. Particularly the asphaltenes are objectionable in the process since they are high-molecular weight, non-distillable oil compounds comprising sulphur, nitrogen and/or oxygen and form oil-insoluble coke precursors. Asphaltenes are generally colloidally dispersed in the petroleum crude oil or oil fraction and when subjected to high temperatures have the tendency to flocculate and to deposit on the catalyst particles. Moreover, at the high conversion temperatures used flocculation is favoured during hydrodesulphurization conditions because the aromaticity of the liquid phase in which said asphaltenes are colloidally dispersed is also reduced by hydrogenation and hydrocracking of the (poly)aromatic compounds.

Of the metal-containing contaminants those containing nickel and vanadium are found to be the most common. According to the literature a vacuum-reduced crude oil may contain over 500 ppmw vanadium and over 100 ppmw nickel, calculated as metal. Generally, these metals occur in the form of thermally stable organometallic complexes, such as metalloporphyrins. A considerable quantity of the organometallic complexes are associated with the asphaltenes and thus become concentrated in the residual fraction.

The primary difficulty in hydrodesulphurizing crude oils and/or heavy oil fractions of the type discussed resides in the above asphaltene deposition on the catalyst particles since it results in heavy coke formation through degradation of the said asphaltenic compounds. The simultaneous deposition of the heavy metals on the catalyst particles together with coke formation from these asphaltenes interferes with the capability of the catalyst to effect a conversion of, in particular, sulphur-containing compounds. Secondly, the carbonaceous deposit formed during asphaltene flocculation causes the catalyst particles to become bound together, resulting in plugging of the fixed catalyst bed accompanied by a rapidly increasing pressure drop, to which coke formation will eventually also contribute. The increasing pressure drop requires extra compression power, which in practice is often no longer available, and finally the pressure drop may become so high that it cannot be remedied at all. The process must then be interrupted and the catalyst inventory be replaced or, if at all possible regenerated.

THE INVENTION

From the above it will be clear that there is still a need for a technical and economically feasible process for the continuous hydrodesulphurization of residual hydrocarbon oils. The main object of the present invention is to provide such a continuous process. In the process according to the invention the hydrodesulphurization is carried out substantially in the liquid phase and the reactants move cocurrently through a substantially fixed catalyst bed. During the operation fresh catalyst is periodically introduced at the top of said catalyst bed and spent catalyst is withdrawn at the bottom thereof. Although the most important application of the process according to the invention is the catalytic hydrodesulphurization of residual hydrocarbon oils, the process may also be used for other catalytic hydroconversions of residual hydrocarbon oils, such as hydrocracking, for instance for the production of HVI lubricating base oils from long and short residues.

Another object of the invention is to provide apparatus in which such a process may be carried out.

An advantage of carrying out hydrodesulphurization of residual hydrocarbon oils according to the invention is that the resulting product is of constant quality, because after an initial period of stabilization, the catalyst has a constant overall activity for both desulphurization and side reactions. Normally it is only the activity of the catalyst for desulphurization that is kept constant during a run, e.g., by increasing the reactor temperature. Other product properties, such as the viscosity, may vary considerably.

Another advantage of carrying out hydrodesulphurization of residual hydrocarbon oils according to the present invention is the improvement of the on-stream time because it is not necessary for the unit to be shut down for catalyst replacement. This on-stream time is further improved because the fresh catalyst does not require special presulphiding but is presulphided in situ upon introduction into the reactor.

The process according to the invention is carried out substantially in the liquid phase. This means that during the process at least 80% of the residual hydrocarbon oil to be converted is present in the liquid phase. If desired, the process according to the invention may also be carried out completely in the liquid phase. In that case during the process all the residual oil to be converted is present in the liquid phase and no more hydrogen is used for the hydroconversion than can be dissolved in the liquid hydrocarbon phase under the reaction conditions prevailing, the formation of a gas phase thus being prevented. The process according to the invention is further carried out over a substantially fixed catalyst bed. This means that during the process the catalyst bed may contract or swell less than 10%, depending on whether the operation is carried out in downflow or upflow, respectively. This 10% contracting or swelling of the catalyst bed relates to the volume of the catalyst bed during operation as compared with the volume which the loosely packed catalyst bed in oil occupies when no oil moves through the bed.

Catalyst introduction will be periodical or intermittent. When the periods between successive introductions are kept relatively very short, the introduction of fresh catalyst may become quasi-continuous. Catalyst withdrawal from the bottom of the bed is preferably — but not necessarily — done simultaneously with catalyst introduction, as in that particular case the hydroconversion process will be disturbed least.

As hydroconversion of residual oils is carried out at high pressure and temperature both introduction and withdrawal of catalyst have to be done at the pressure applied for the hydroconversion, while in the latter case a spent catalyst has to be handled that still is hot. Preferably also the fresh catalyst to be introduced is at an elevated temperature to prevent the catalyst from encountering a temperature shock.

The fresh catalyst is preferably introduced as a catalyst slurry in a hydrocarbon oil for ease of introducing and evenly spreading said catalyst on top of the catalyst bed. The hydrocarbon oil used for slurrying the catalyst preferably boils substantially above 350°C. Suitable oils are a flashed distillate, heavy gas oils, cycle oils and the like. It is perferred, however, to use the residual oil to be hydroprocessed and/or the hydroprocessed oil product recovered from the process for slurrying the catalyst. The catalyst slurry is preferably introduced as a hot slurry.

Any of the well-known hydrodesulphurization catalysts may be used in the process of the invention. Particularly preferred are the sulphur-resistant catalysts comprising one or more metals of Group VIB, VIIB and/or VIII, their sulphides and/or oxides deposited on an amorphous refractory inorganic oxide of Group II, III or IV elements, or compositions of said inorganic oxides. Suitable examples of catalysts of the preferred type comprise nickel-tungsten, nickel-molybdenum, cobalt-molybdenum or nickel-cobalt-molybdenum on silica, alumina, magnesia, zirconia, thoria, boria or hafnia or compositions of the said inorganic oxides, such as silica-alumina, silica-magnesia, alumina-magnesia and the like.

The catalyst mentioned may comprise further additives, such as boron phosphate or phosphor, and/or halogens, such as fluorine and chlorine. The first-mentioned compound may be present in an amount of from 10 to 40% by weight calculated on the total catalyst and more preferably of from 15 to 30 %w, whereas the halogens and phosphor are used in an amount of less than 10 %w.

Although the metal components may be present in any amount, the catalyst used preferably comprises of from 2 to 35 %w and more preferably of from 5 to 25 %w of total metal. The metals of Group VIII are generally applied in a minor quantity of about 0.1 to 10 %w and the metals of Group VIB are generally applied in a major quantity, of about 2.5 to 30 %w, while as mentioned above, the total amount of metal components is preferably less than 35%. The atomic ratio of said Group VIII and Group VIB metals may vary within wide ranges, a range of from 0.1 to 5 being preferred, however.

Particularly suitable catalysts for the purpose of the present invention are a commercially available hydrodesulphurization catalyst comprising 4.1 pbw Co/10.3 pbw Mo/100 pbw $Al_2O_3$ and another comprising 3.1 pbw Ni/11.7 pbw Mo/2.6 pbw P/100 pbw $Al_2O_3$. In our Netherlands patent application No. 6814628 a novel silica-alumina-based catalyst is described which may advantageously be used for hydrodesulphurization purposes.

The groups referred to in the above are groups of the Periodical System of Elements as published in the Handbook of Chemistry and Physics (43rd Ed.) of the Chemical Rubber Publishing Co.

Instead of the inorganic oxide carriers, carriers of the zeolitic type may be used. Particularly suitable aluminosilicate zeolites are the zeolites having a $SiO_2/Al_2O_3$ molar ratio of at least 3, such as zeolite Y. The said aluminosilicate zeolites may be used as such or embedded in an inorganic matrix, such as alumina. Usually the matrix is applied in an amount of from 20 – 80 %w of carrier.

The catalyst particle size is generally smaller than 5 mm and preferably in the range of from 0.5 to 3.0 mm. Particularly suitable for the purpose of the present invention is a catalyst particle size from 0.7 to 2.0 mm. The catalyst may have any shape such as pellets, cylinders, tablets, granules, and so on. In order to keep the catalyst bed easily moving, however, beads are preferred.

The reaction conditions used for hydrodesulphurization according to the present invention are conventional for this type of operation and may vary within wide limits, depending on the type of feedstock used. The temperature is in the range of from 300° to 475°C and more preferably from 385° to 445°C and total pressures are from 30 to 350 $kg/cm^2$ and more preferably from 75 to 225 $kg/cm^2$. The weight hourly space velocity may vary between wide ranges and is generally between 0.1 and 10 parts by weight of fresh oil feed per part by volume of catalyst per hour, 0.3 to 5 pbw of fresh oil feed being preferred. The severity of the hydrodesulphurization operation is preferably such that at least 40% of desulphurization is obtained and more preferably 50 to 85%.

The hydrogen required for the hydrodesulphurization may be provided as a hydrogen-containing gas stream, such as a reformer off-gas stream, or as substantially pure hydrogen. Preferably the hydrogen-containing gases contain at least 60 %v of hydrogen. The quantity of hydrogen supplied should be in the range of from 10 to 10,000 Nl and preferably of from 250 to 2,000 Nl per kg of residual hydrocarbon oil. Part of said hydrogen may be introduced at various places in the reactor so as to control the temperature therein. Recycled desulphurized product may be combined with the fresh oil before or after the latter has been heated. Recycled desulphurized product may also be introduced at various places in the reactor, so as to control the temperature therein.

The hydroconversion process according to the present invention may be performed either in upflow or in downflow operation, upflow operation being preferred. Upflow operation results in a better wetting of the catalyst and a better liquid distribution. Further it gives a better temperature control of the catalyst bed. Additional advantages of application of upflow operation in the process of the invention are:

1. The feed passes first the oldest catalyst, which acts as a sieve for particulate matter present in the feed, such as iron oxides and sand, and removes the bulk of inorganic contaminants from the oil, such as vanadium, nickel and sodium chloride.
2. Only the oldest and most fouled catalyst is discharged from the reactor; hence, the chances of plugging of the catalyst bed are reduced. This is even more true if the bottom of the catalyst bed is brought in turbulent motion, at least during the discharging procedure.
3. The hydrogen sulphide concentration in the reactor is the lowest for the oldest catalyst in the bottom of the reactor and the highest for the fresh catalyst in the top of the reactor. This is an ideal profile of the hydrogen sulphide concentration, as the high concentration in the top of the reactor tempers the high initial hydrodesulphurization activity of the fresh catalyst, which helps to increase the stability of the catalyst for hydrodesulphurization, whereas the hydrodesulphurization activity of the older catalyst in the lower part of the reactor is enhanced by the low concentration of hydrogen sulphide.
4. The principle of countercurrent operation (in that the catalyst flows downwards and the reactants upwards). As a result of this countercurrent operation a higher space velocity and/or a lower sulphur content of the product can be achieved than in conventional fixed-bed operation or in downflow operation according to the invention under otherwise identical operating conditions.

The residual oil to be hydrodesulphurized according to the process of the invention can be any sulphur-containing petroleum oil comprising residual material. During the process also partial denitrification will occur if also nitrogen-containing compounds are present in said oil. The present process is especially advantageous in connection with residual oils comprising at least 20 ppmw vanadium and having a sulphur content of at least 1.0 %w. It will be evident that the feed stock may be a whole crude. However, since the high sulphur components of a crude oil and also of the metallo-organic compounds tend to concentrate in the higher-boiling fraction the present process is especially of importance for the hydrodesulphurizationn of a bottoms fraction of a petroleum crude, i.e. one obtained by topping of the said crude or by atmospheric or vacuum distillation of the crude. Typical residues will normally be substantially composed of hydrocarbons and/or one or more organic carbon compounds containing hetero atoms, boiling above 360°C and containing a substantial amount of asphaltic material. Thus said oil feed can be one having an initial boiling point or a 5% boiling point somewhat below 360° C provided that a substantial proportion, say, 40 to 50 %v or more of its hydrocarbons, boils above 360°C. In principle the residual oil may be a topped crude, a long residue or a short residue. The oil feed may be subjected to a feed pretreatment, such as flashing, deasphalting, hydrorefining in the absence of any catalyst, or to combinations of such pretreatments.

Other heavy oil fractions which may be processed according to the invention are black oils, visbreaker effluents, tar sand oils and the like or mixtures of such oil fractions. The oil fractions may also be processed in admixture with the residual oils mentioned.

It is preferred that the residual oil should have an alkali metal and/or alkaline earth metal content of less than 50 ppmw. Preferably this alkali metal and/or alkaline earth metal content is in the range of from 1 to 25 ppmw. If content of said metals in the oil to be hydrodesulphurized is above the upper limit of the range indicated it should preferably be reduced by appropriate treatment, such as washing or the like.

The process according to the invention may be carried out in an apparatus comprising at least one high-pressure reaction vessel, an inlet and an outlet and means for introducing fresh catalyst and discharging spent catalyst at operating pressure. This apparatus preferably comprises, moreover, a high-pressure inlet vessel, from which fresh catalyst is introduced into the reaction vessel, and a high-pressure discharge vessel, into which spent catalyst is discharged from the reaction vessel. In a preferred embodiment of the invention discharging of spent catalyst from the reaction vessel takes place via a conduit in which the catalyst first passes a solid-handling valve and subsequently a liquid- and gas-tight high-pressure valve, which conduit is provided with means for flushing the high-pressure valve before closing. In a more preferred embodiment of the invention also the introduction of fresh catalyst into the reaction vessel takes place via a conduit of the above-described type. For the valve-flushing procedure a side stream of the liquid feed is very suitable. The catalyst bed in the reaction vessel near the solid-handling valve is preferably brought in turbulent motion at least during the discharging procedure. This turbulent motion of the catalyst bed may very suitably be obtained by introducing liquid feed and/or gas in the bottom of the catalyst bed near the solid-handling valve.

The present patent application also relates to a novel apparatus suitable for carrying out the process according to the invention. This apparatus comprises:

a. a high-pressure inlet vessel for fresh catalyst with one or more inlets for fresh catalyst and/or liquid,
b. a high-pressure reaction vessel with a feed inlet and a product outlet,
c. a high-pressure discharge vessel for spent catalyst with one or more outlets for spent catalyst and/or liquid,
d. a conduit connecting the vessels mentioned under (a) and (b), which conduit is at least provided with a solid-handling valve, e. a conduit connecting the vessels mentioned under (b) and (c), which conduit is provided with a solid-handling valve facing the reaction vessel mentioned under (b), a liquid- and gas-tight high-pressure valve facing the discharge vessel mentioned under (c) and an inlet for liquid connected to the conduit between the two valves, which inlet is provided with a liquid-tight high-pressure valve.

In a preferred embodiment of the novel apparatus according to the invention the conduit connecting the vessels mentioned under (a) and (b) is provided with a solid-handling valve facing the inlet vessel mentioned under (a), a liquid- and gas-tight high-pressure valve facing the reaction vessel mentioned under (b) and an inlet for liquid connected to the conduit between the two valves, which inlet is provided with a liquid-tight high-pressure valve.

In another preferred embodiment of the novel apparatus according to the invention an inlet for liquid and/or gas is present in the reaction vessel mentioned under (b) near the solid handling valve mentioned under (e).

DESCRIPTION OF DRAWINGS

The pertaining FIG. 1 is a schematic drawing of an apparatus which may be used for carrying out the process of the invention. It consists of three high-pressure vessels 7, 13 and 22, vessel 13 being the hydroprocessing reactor and containing the fixed catalyst bed. Vessel 7 is a catalyst inlet vessel and vessel 22 a catalyst discharge vessel. Inlet vessel 7 is connected to reactor 13 via its outlet 8 and a high-pressure cone valve 9 in conduit 11 and similarly reactor 13 is connected to discharge vessel 22 via its outlet 15 and a high-pressure cone valve 18 and conduit 20. Outlet 8 of the catalyst inlet vessel can be closed through valve 9 by rotating axis 10 in the appropriate direction and similarly the outlet of reactor 13 can be closed by means of valve 18 and axis 19. Opening and closing of said outlets may be done either manually or automatically. For the process envisaged automatic control of the cone valves is preferred.

Conduit 11 has an outlet 12 which discharges at the top of the reactor. Similarly conduit 20 discharges at the top of vessel 22 by means of its outlet 21. This outlet too may be provided with an additional valve.

Inlet vessel 7 is further provided with inlet conduits 4 and 5 controlled respectively by valves 3 and 6. Hydroprocessing reactor 13 is provided with inlet conduit 1 controlled by valve 2 and with outlet conduit 16 controlled by valve 17.

Catalyst discharge vessel 22 is provided with outlet conduit 25 controlled by valve 26 and with a conduit 27 controlled by valve 28 for (de)pressuring said vessel. Outlet 23 is closed by valve 24.

In operating the apparatus as shown the feed to be hydroprocessed together with the hydrogen required and either or not together with recycled hydroprocessed oil product is introduced into reactor 13 via conduit 1. Reactor 13 is provided with a fixed bed of a suitable hydroprocessing catalyst. High-pressure valves 9 and 18 are in a closed position. The hydroprocessed product produced is recovered via conduit 16 which may be connected to a high-pressure separator (not shown). Part of the product recovered may be recycled to the hydroconversion process for admixture with the fresh feed as discussed above.

In case it is preferred to operate the reactor in upflow conduit 16 is used as inlet and conduit 1 is used as outlet for the hydrodesulphurization reactor. In this case conduit 1 may be connected to a high-pressure separator.

For catalyst introduction into reactor 13 catalyst inlet vessel 7 is filled with a slurry of the fresh catalyst in a suitable hydrocarbon oil which slurry is introduced via conduit 5. It is particularly advantageous to use the hydroprocessed oil product as the hydrocarbon oil, but hydrocarbon oils such as cycle oils, heavy gas oil and the like may be used as well. The catalyst slurry is then fed into the hydroprocessing reactor by opening valve 9 and simultaneously opening valve 18. The required power to press the catalyst slurry into reactor 13 may be provided by further introducing hydrocarbon oil under the operating pressure into vessel 7 via conduit 5. More advantageously however, said pressure is provided by the pressurized hydrocarbon oil mixture flowing through conduit 1. So after filling inlet vessel 7 valve 6 is shut and simultaneously with opening of valve 9 valve 3 is partially or totally opened. The position of valve 2 is regulated in accordance with the opening position of valve 3. Catalyst slurry now flows into reactor 13 and is evenly distributed on top of the catalyst bed through catalyst distributing means 14 provided in the reactor. At the same time a corresponding amount of spent catalyst is discharged from the said reactor through the opened outlet 15. The discharged catalyst together with desulphurized oil product is collected in discharge vessel 22 which is at about the working pressure of reactor 13.

When the total or desired amount of fresh catalyst has been introduced in the hydroprocessing reactor normal operation is resumed by closing the necessary valves. During catalyst introduction valve 17 in conduit 16 may have partially or totally been closed so that said valve has to be further opened or to be opened as may be the case.

In order to prevent catalyst particles obstructing cone valve 9 it may be desirable to continue with introduction of the hydrocarbon oil mixture of conduit 1 via vessel 7 into reactor 13 some time after the catalyst slurry has been discharged into the reactor mentioned before finally closing said cone valve.

The pressure in vessel 22 is released by opening valve 28 and the spent catalyst is discharged via conduit 23. Any desulphurized oil product discharged simultaneously with spent catalyst from reactor 13 may be recovered via conduit 25 and recirculated to the process.

The above-described apparatus shows the essentials of an apparatus which allows continuous operation under the prevailing conditions. Such an apparatus comprises a series of at least three high-pressure vessels, every vessel in the series but for the last one discharging into the next vessel by means of a solid-handling high-pressure valve, the first vessel of the series comprising means to introduce fresh catalyst therein and the last vessel of the series comprising means to withdraw spent catalyst therefrom and at least one vessel in between the said first and the said last vessel comprising means to introduce and withdraw liquid and gas therefrom. The solid handling high-pressure valve should allow periodic or continuous removal of particulate material from the interior of the pressurized vessels without necessitating a shutting down of said vessel. The high-pressure valve must be able to tolerate total pressures above 50 kg/cm². In the embodiment shown cone valves are used but other solid handling valves may be applied. A suitable valve is the valve as described in U.S. Pat. Nos. 2,711,833 and 2,921,721.

FIG. 2 gives another embodiment for an apparatus according to the invention. Numerals used earlier relate to the same items and concepts as before.

The oil feed and hydrogen containing gas are introduced into the reactor via distributing devices 34 in the bottom of the reactor in such a way as to keep the catalyst in the bottom part of the reactor in turbulent motion. The total swelling of the catalyst bed in the reactor due to this motion is less than 10%. The product leaves the reactor via a conduit 1. The reactor 13 is connected to the catalyst discharge vessel 22 via a cone valve 18, which is operated via the shaft 19, a conduit 20 and a valve 30. The only action of the cone valve 18 is to control the passage of catalyst particles from the reactor 13 into the conduit 20. The conduit 20 has essentially the same pressure as the reactor 13 so that there is only a small pressure drop if any over the cone valve 18. Before catalyst is discharged the discharge vessel 22 is pressurized with oil injected into the conduit 20 via valve 33 in conduit 32. Valve 30 is open and valves 24 and 28 are closed during this operation. The oil and gas may be introduced together through device 34 or individually into the reactor. In the figure it is assumed that they are introduced together. By opening the cone valve 18 and the valve 28 the catalyst leaves the reactor and passes the cone valve 18 in a fluidized state due to the special shape of the cone valve. The discharged catalyst together with oil pass the conduit 20 where this slurry is preferably mixed with oil introduced via valve 33 in order to cool the slurry to below a temperature where cracking of the oil is likely to occur (say 300°C).

The slurry passes valve 30 and is dropped in the discharge vessel 22 where the catalyst settles whereas the oil is leaving the vessel through conduit 27 and valve 28.

When the desired amount of catalyst is discharged from the reactor the cone valve 18 is closed so as to stop the passage of catalyst. With oil introduced via valve 33 the conduit 20 and valve 30 are flushed free of catalyst whereafter both valves can be closed, without damaging their seats. The discharge vessel 22 can now be depressurized after which the spent catalyst can be dumped.

Fresh catalyst may reach reactor 13 through conduit 11 when valves 9 and 29 are open. Oil is introduced through conduit 4. After closure of valve 9 the conduit 11 and valve 29 may be flushed free of catalyst with oil introduced via valve 31 and conduit 35, whereafter valves 31 and 29 can be closed. Flushing of conduit 11 and valve 29 may also be carried out with oil introduced through conduit 4 in case the whole mass of catalyst present in vessel 7 has been introduced in reactor 13. In this case conduit 35 and valve 31 are not necessary.

The invention will now be elucidated by means of the following examples.

A Caribbean crude oil and a long residue derived from a Middle-East crude wwere hydrodesulphurized substantially in the liquid phase. The reactants moved cocurrently over a fixed catalyst bed of 1.5 mm extrudates. Experiments in upflow operation with catalyst replacement according to the invention and experiments in downflow operation without catalyst replacement were carried out. The properties and compositions of the feeds, the reaction conditions and the results of the experiments are summarized in the table. The figures in the table show that at a fixed WHSV (weight hourly space velocity) a lower sulphur content of the product is obtained and that at a fixed sulphur content of the product a higher WHSV can be applied, if the hydrodesulphurization is carried out in upflow with catalyst replacement according to the invention as compared with downflow operation without catalyst replacement.

| Feed | Caribbean crude oil | | Middle East crude — derived long residue | |
|---|---|---|---|---|
| Properties and composition of the feed | | | | |
| specific gravity ($d_4^{70}$) | 0.9551 | | 0.9184 | |
| sulphur content, %w | 2.84 | | 3.91 | |
| nitrogen content, %w | 0.43 | | 0.21 | |
| vanadium content, ppmw | 420 | | 49 | |
| nickel content, ppmw | 58 | | 13 | |
| viscosity at 210°F, cS | 99 | | 26 | |
| Hydrodesulphurization conditions | | | | |
| temperature, °C | 375 | | 420 | |
| pressure, kg/cm² | 150 | | 150 | |
| exit gas rate, Nl/kg feed | 500 | | 600 | |
| WHSV, kg.l⁻¹.h⁻¹ | 0.51 | | 3.05 | |
| catalyst | Ni/Co/Mo/Al₂O₃ | | Co/Mo/Al₂O₃ | |
| type of operation | upflow | downflow | upflow | downflow |
| catalyst replacement acc. to invention | yes | no | yes | no |
| sulphur in product, %w | 1.20 | 1.49 | 0.61 | 0.84 |
| WHSV at 1.49 %w sulphur in product, kg.l⁻¹.h⁻¹ | 0.77*) | 0.51 | | |
| WHSV at 0.84 %w sulphur in product, kg.l⁻¹.h⁻¹ | | | 4.52*) | 3.05 |

*) calculated

We claim as our invention:

1. An apparatus suitable for carrying out a continuous process for hydrodesulfurizing residual hydrocarbon oils in the presence of hydrogen substantially completely dissolved in a liquid phase through a substantially fixed catalyst bed wherein catalyst is periodically introduced at the top of said catalyst bed and spent catalyst is periodically withdrawn from the bottom thereof, which comprises:

a. a high-pressure inlet vessel for containing fresh catalyst, said inlet vessel having at least one inlet for fresh catalyst and liquid, means for pressuring and depressuring, and at least one outlet for discharging fresh catalyst;
b. a high-pressure reaction vessel having a residual oil feed inlet, a reaction product outlet, a catalyst inlet and a catalyst outlet and containing a substantially fixed bed of catalyst;
c. a high-pressure discharge vessel for receiving spent catalyst from said reaction vessel, said discharge vessel having at least one inlet for spent catalyst and liquid, means for pressuring and depressuring and at least one outlet for discharging spent catalyst and liquid;
d. a conduit provided with a solid-handling valve connecting the vessels described in (a) and (b); and
e. a conduit provided with a solid-handling valve connecting the vessel described in (b) and (c), a high-pressure valve between said solid-handling valve and said discharge vessel described in (c) and an inlet for valve-flushing liquid connected to the conduit between said valves, said liquid inlet being provided with a high-pressure valve.

2. The apparatus of claim 1 wherein the solid-handling valves are cone valves.

3. The apparatus of claim 1 wherein the conduit connecting the vessels described in (a) and (b) is provided with a high-pressure valve between said solid-handling valve and said reaction vessel described in (b) and an inlet for valve-flushing liquid connected to the conduit between said valves, said inlet being provided with a high-pressure valve.

4. The apparatus of claim 3 wherein the soild-handling valves are cone valves.

* * * * *